March 19, 1940.  W. E. URSCHEL  2,194,058
FRUIT-STEMMING MACHINE
Filed Nov. 20, 1937  3 Sheets-Sheet 1
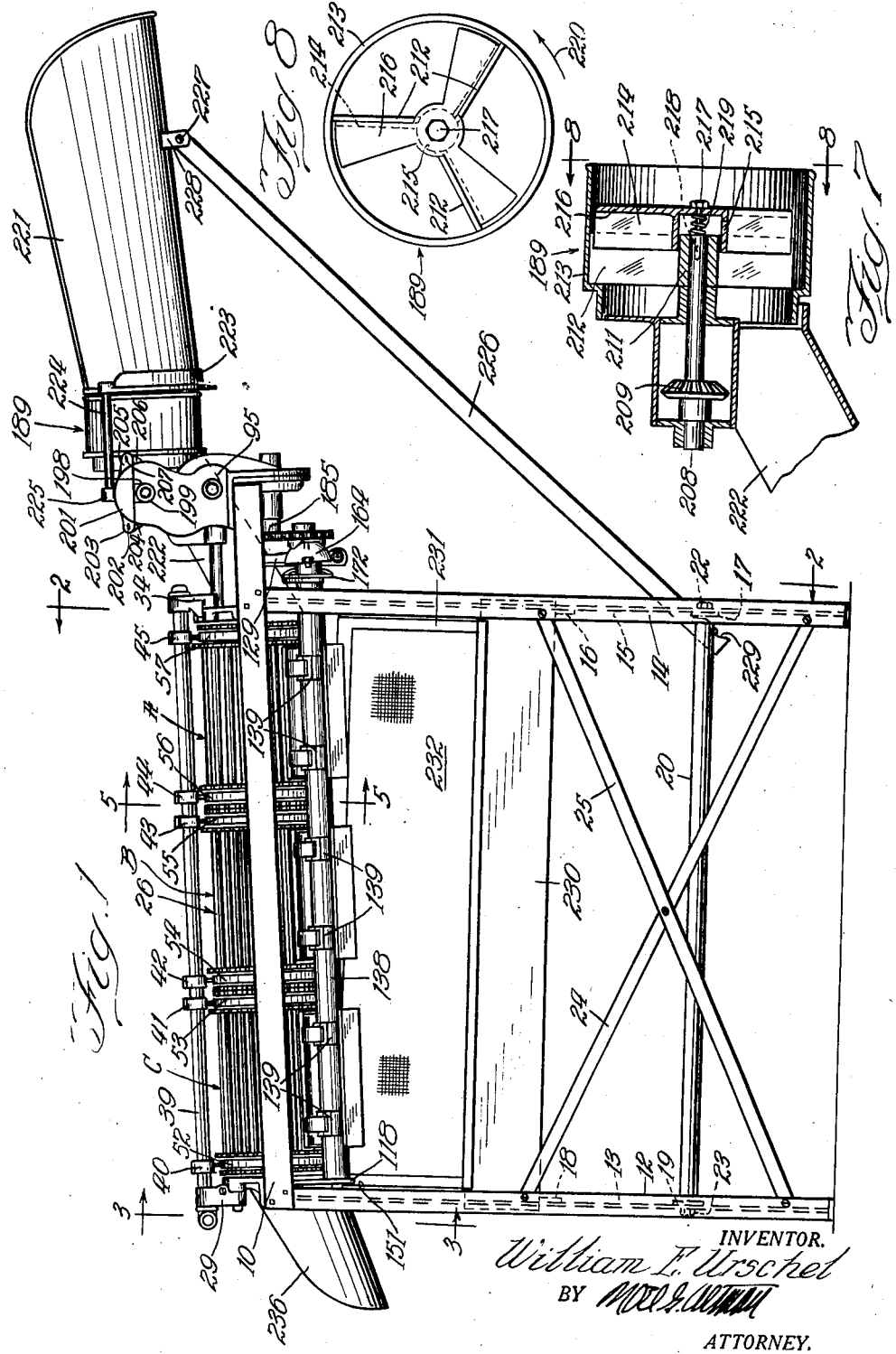
INVENTOR.
William E. Urschel
BY
ATTORNEY.

March 19, 1940.  W. E. URSCHEL  2,194,058
FRUIT-STEMMING MACHINE
Filed Nov. 20, 1937  3 Sheets-Sheet 2
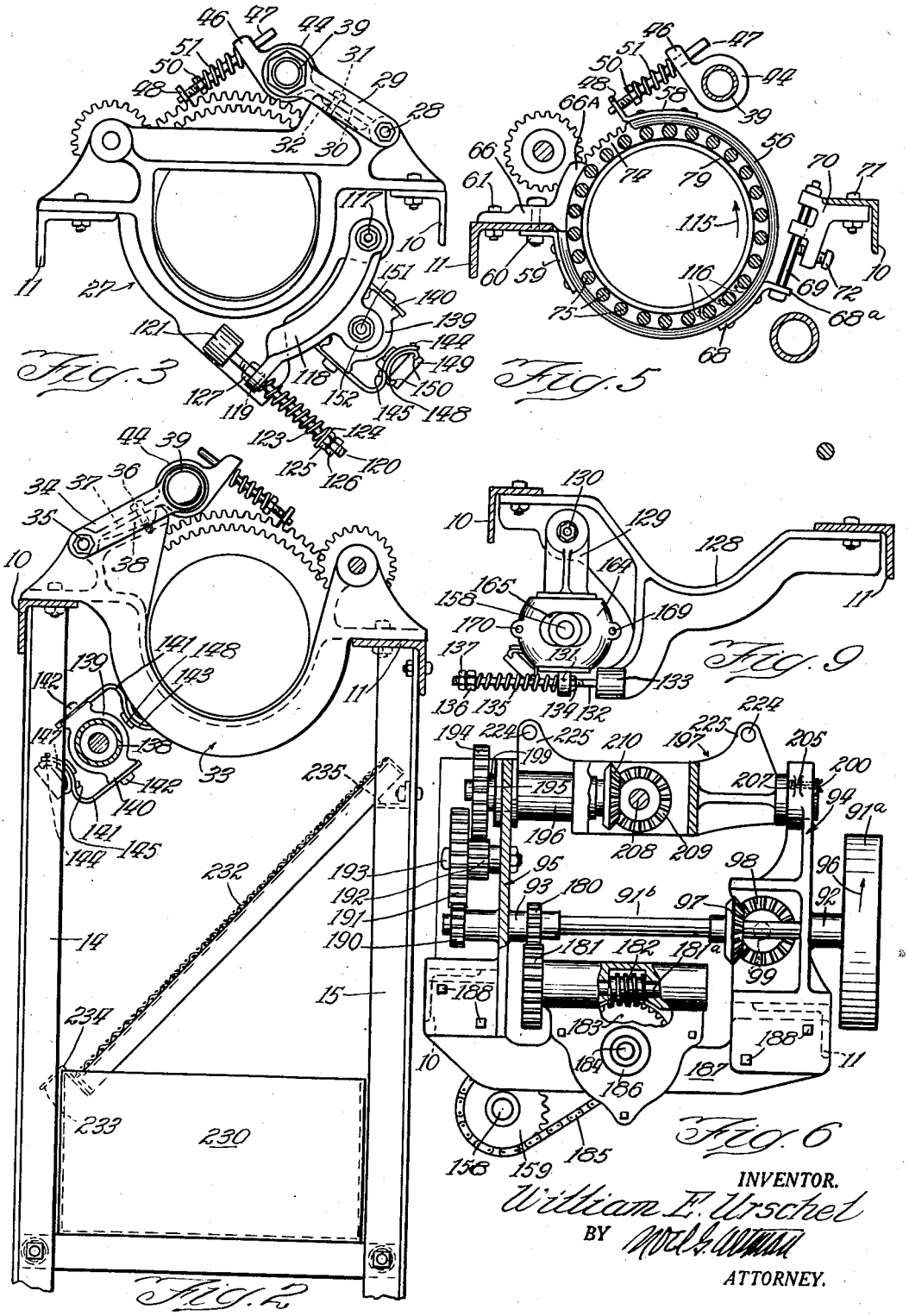
INVENTOR.
William E. Urschel
BY
ATTORNEY.

March 19, 1940.  W. E. URSCHEL  2,194,058
FRUIT-STEMMING MACHINE
Filed Nov. 20, 1937  3 Sheets-Sheet 3
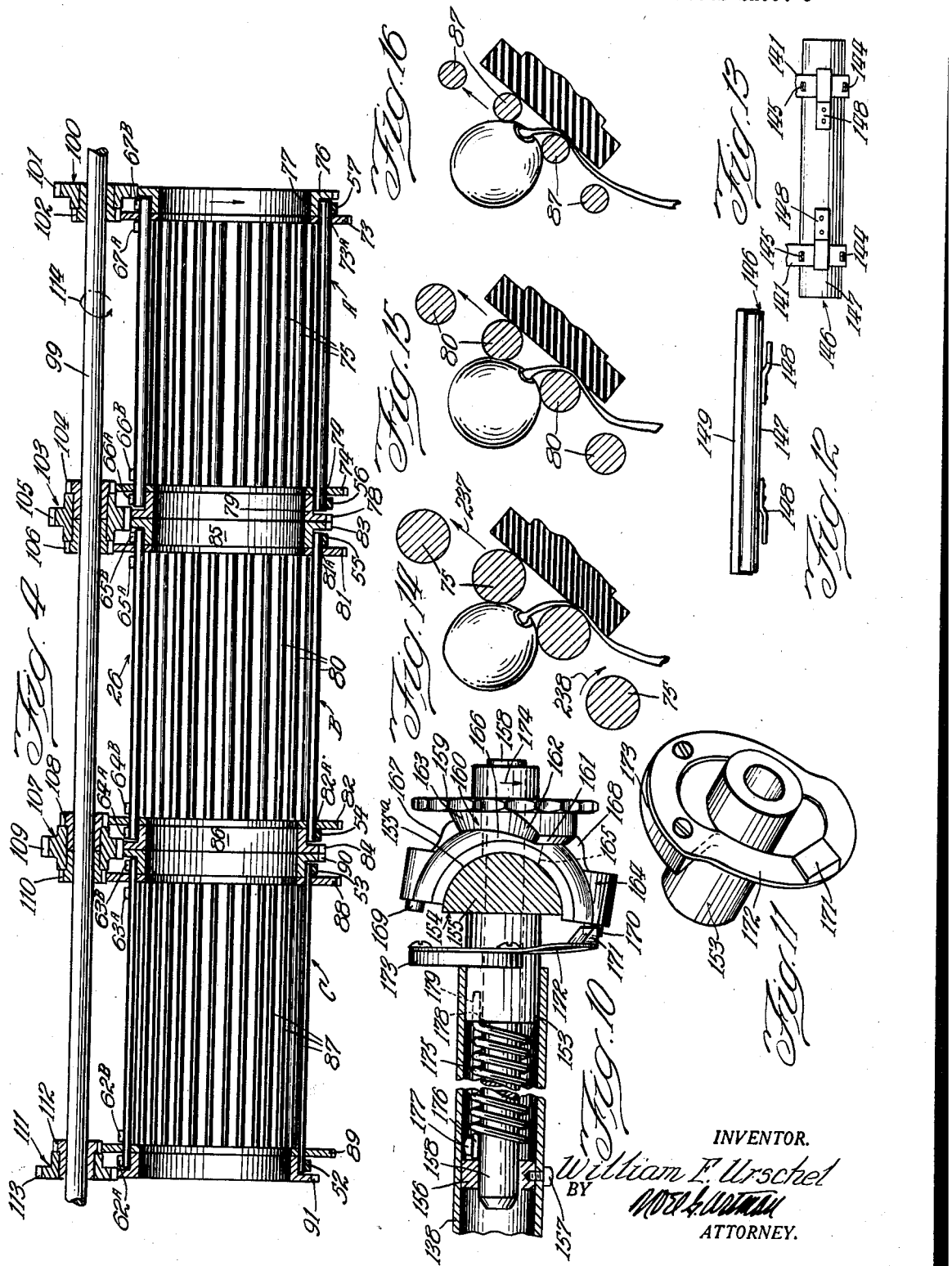
INVENTOR.
*William F. Urschel*
BY
ATTORNEY.

Patented Mar. 19, 1940

2,194,058

UNITED STATES PATENT OFFICE 2,194,058

FRUIT-STEMMING MACHINE

William E. Urschel, Valparaiso, Ind.

Application November 20, 1937, Serial No. 175,571

17 Claims. (Cl. 146—55)

This invention relates to a fruit-stemming machine and has to do particularly with improvements upon my machine disclosed in United States Patent No. 2,002,161 entitled Cherry stemmer.

An object of the present invention is the provision in a fruit-stemming machine wherein fruit to be stemmed is progressed through a cylinder having walls formed of a plurality of axially extending roller-rods, of such a cylinder divided into longitudinal sections wherein the roller-rods of adjacent sections are of different diameter so that fruit having longer or more easily removed stems may be the first operated upon in the cylinder section having roller-rods of greatest diameter, while fruit possessing shorter or less easily removed stems will be stemmed in a succeeding cylinder section in which the rods are of less diameter. An arrangement of this nature minimizes bunching and the likelihood of bruising or crushing the fruit because of the stems of too great a number of fruit articles being pulled upon simultaneously at any one section of the cylinder.

Another object of the present invention is the provision of a fruit-stemming machine comprising a fruit-holding cylinder having side walls formed of roller bars and wherein improved yieldable bearing means is provided for rotatively supporting the cylinder.

Still another object of the present invention is the provision in a machine as the above of a new stem-gripping shoe mechanism which is adapted to interchangeably present shoes into cooperable relation with the fruit-carrying cylinder.

Other desirable objects will appear as the invention is hereinafter described with reference to the accompanying three sheets of drawings hereby made a part of this specification, and wherein:

Fig. 1 is a side elevational view of a machine embodying the principles of the present invention;

Fig. 2 is an end view taken on the line 2—2 of Fig. 1, there being parts removed for clarity;

Fig. 3 is a fragmentary end view of the machine taken on the line 3—3 of Fig. 1;

Fig. 4 is a sectional view taken axially through the fruit-holding cylinder of the machine shown in Fig. 1;

Fig. 5 is a transverse sectional view taken on the line 5—5 of Fig. 1;

Fig. 6 is a fragmentary view taken partly in section and illustrating a part of the power trains of the illustrated machine;

Fig. 7 is a sectional view taken through a rotatable feed device;

Fig. 8 is a view taken on the line 8—8 of Fig. 7;

Fig. 9 shows a part of the apparatus for manipulating stem-gripping shoes;

Fig. 10 is a fragmentary sectional view showing parts of the manipulating mechanism for the stem-gripping shoes;

Fig. 11 is a perspective view further illustrating cam and latch members also shown in Fig. 10;

Fig. 12 is a side view of a stem-gripping shoe;

Fig. 13 is a back view of a stem-gripping shoe; and

Figs. 14, 15 and 16 are fragmentary sectional views illustrating the manner in which stems of fruit are adapted to be engaged between stem-gripping shoes and roller-rods in different sections of the fruit-carrying cylinder.

Reference is now invited to Figs. 1, 2 and 3 and particularly to the machine frame which comprises two longitudinal side members 10 and 11 to the ends of which are bolted upright legs 12, 13, 14 and 15 disposed respectively at the four corners of said frame. Legs 14 and 15 are held in spaced relation by similar cross pieces 16 and 17 while legs 12 and 13 are likewise held by cross pieces 18 and 19 whose ends are shown by dotted lines in Fig. 1. Tubular spacer members 20 are placed between legs 12 and 14 and between legs 13 and 15. Rods (not shown) extend through the members 20 and through suitable apertures in the legs. The ends of the rods (not shown) are threaded, thereby enabling them to receive nuts 22 and 23 for holding the associated parts in assembly. Further rigidity is insured by means of inclined cross braces 24 and 25 which are bolted to legs 12 and 14.

A fruit-carrying cylinder 26, shown in Figs. 1, 4 and 5, is divided into three sections, A, B, and C. The fruit-carrying cylinder 26 is inclined downwardly from back to front as may be seen in Fig. 1. During the operation of the machine, fruit operated on thereby is passed successively through the cylinder sections A, B and C in the order named.

Bearing means for rotatively carrying the cylinder 26 within the machine frame will now be described. An end casting 27, Fig. 3, is attached to the frame side-members 10 and 11. Pivotally secured to the casting 27 by means of a bolt 28 is an arm 29. Said arm 29 has a rib 30 shown in dotted outline in Fig. 3 and which is apertured for receiving a bolt 31. The latter bolt 31 extends through the apertured rib 30 and into a threaded recess 32 in the casting 27, thereby coacting with the pivot bolt 28 for holding the arm 29 rigidly in place upon the machine.

Near the opposite or back end of the machine frame an end casting 33 is provided upon the frame side-members 10 and 11; see Fig. 2. An arm 34 similar to the arm 29 is pivotally attached to the casting 33 by a bolt 35. Said arm 34 is secured rigidly to the casting 33 by means of a bolt 36 which extends through an apertured rib 37 in the arm 34 and into a threaded recess 38 within the casting 33. Arms 29 and 34 carry a spray-pipe 39 within their upwardly extending ends. While the machine is in operation water is directed into the pipe 39 and permitted to escape through a row of apertures (not shown) extending lengthwise of and along its lower side. The water thus escaping from the pipe is adapted to enter the cylinder 26 and cleanse the fruit therein.

A plurality of brackets 40 to 45 are secured to the spray-pipe 39. Each bracket 40 to 45 has an arm 46 in which there is reciprocally disposed a rod 47; see Fig. 5. Each rod 47 has a threaded section carrying a nut 50 which serves as an abutment for one end of a compression spring 51. The springs 51 which abut at their opposite ends against their associated arms 46 constantly urge their respective rods 47 to move in one direction with respect to the arms 46.

The brackets 40 to 45 have respectively associated therewith flexible circular bearing members 52 to 57 as illustrated in Figs. 1, 4 and 5. Inasmuch as each of the bearing members 52 to 57 is of substantially similar construction, a detailed description will be given only of the bearing member 56 and its associated supporting parts and with reference to Fig. 5. Each of the bearing members as 56 is preferably constructed of fabric-reinforced rubber. Each bearing member as 56 has a metal strap 58 secured to one of its ends. An apertured ear 48 upon each strap 58 is engaged by one end of a rod 47. The opposite ends of the bearing members as 56 are connected by metal straps 59 which together with bolts as 60 provide means whereby the members are secured to the frame side-member 11. Also secured to the frame side-member 11 by bolts as 60 and additional bolts as 61 are brackets 62 to 67, bracket 66 being shown in Fig. 5. Bracket 62 has bifurcations 62A and 62B; bracket 63 has bifurcations 63A and 63B; and so on, bracket 67 having bifurcations 67A and 67B. The shape of brackets 62 to 67 and the bifurcations thereof 62A and 62B to 67A and 67B is plainly illustrated by bracket 66 in Figs. 4 and 5. Said brackets are for preventing axial movement of roller-rod carrier gears as 74 as will be explained more fully hereinafter.

A metal strap 68 is secured to the mid-section of each of the flexible bearing members as 56 and has an ear 68a engaged by a bolt 69. The bolts 69 are adjustable within respective brackets 70 which are secured to the frame side-member 10 by means of bolts 71. Lateral deflection of the bolts 69 and hence of the straps 68 and the mid-section of the bearing members as 56 may be effected by means of bolts 72 carried within threaded apertures in the brackets 70.

Referring now to Fig. 4, and particularly to cylinder section A, annular roller-rod carrier gears 73 and 74 will be seen near the opposite ends of such cylinder-section. The gears 73 and 74 are provided with a plurality of selectively spaced bearings 73A and 74A in which there are loosely mounted a like number of roller-rods 75. Adjacent to the roller-rod carrier gear 73 is an annular gear 76 which has an axially extending flange 77. Flange 77 is of such a diameter that the exterior thereof provides a bearing surface which frictionally engages right end sections, Fig. 4, of the roller-rods 75 and urges said rods to rotate within their bearings 73A and 74A incident to relative rotative movement of the gears 73 and 76.

An annular gear 78 similar to the gear 76, but having its flange 79 directed toward the right instead of toward the left, is disposed at the left ends of roller-rods 75, the exterior of the flange 79 engaging the end sections of the rods 75 and thus cooperating with the flange 77 by imparting rotative force to the rods during relative movement between the gears 73 and 74 and the flanged gears 76 and 78. Cylinder-section A is rotatively supported upon the circular bearing members 56 and 57. In Figs. 1 and 4 the bearing member 56 is shown disposed between the gear-tooth sections of gears 74 and 78 while the bearing member 57 is shown between the gear-tooth sections of gears 73 and 76. The entire assembly of cylinder-section A is adapted to be rotated within the bearing members 56 and 57.

Cylinder-section B is constructed similarly to cylinder-section A, the principal difference being that the roller-rods 80 thereof are of less diameter than the roller-rods 75 and that the centers of roller-rods 80 are spaced apart at slightly less distances than are the centers of roller-rods 75. Roller-rods 80 are journalled within bearings 81A and 82A of gears 81 and 82 which correspond to gears 73 and 74. Gears 83 and 84 have axial flanges or roller-rod driver members 85 and 86 corresponding to the flanges or driver members 77 and 79 on flanged gears 76 and 78. Cylinder-section B is rotatively carried upon flexible bearing members 54 and 55 in the identical manner in which cylinder-section A is carried upon the bearing members 56 and 57.

Cylinder-section C is constructed like cylinder-sections A and B with the principal difference that roller-rods 87 therein are of less diameter than roller-rods 75 or 80 and in the further respect that roller-rods 87 are spaced apart less distantly than either the roller-rods 75 or 80. In the C section of the cylinder or tunnel 26, gears 88 and 89 correspond to the gears 81 and 82 while the flanged gears 90 and 91 correspond to the flanged gears 83 and 84 of section B. Cylinder-section C is rotatively supported in bearing members 52 and 53.

Relative axial movement of the cylinder sections A, B, and C is precluded by the abutment of flanged gears 78 and 83 and the flanged gears 84 and 90 with one another and by the bifurcations as 66A and 66B of brackets as 66. Axial movement of the cylinder or tunnel 26 as a unit is prevented by the end castings 27 and 33. Lateral deflection of the cylinder or tunnel 26 is prevented by the several bearing members 52 to 57. The yieldable bearing members 52 to 57 are held tautly against and in conformity with the end sections of the roller-rods as 75 which they engage, by means of the adjustable bolts 69 and by means of the reciprocal rods 47 which are constantly urged by springs 51 in a direction to grip said bearing members about the roller-rods.

The machine receives its driving power through a pulley 91a, Fig. 6, which is fixed to a shaft 91b. Shaft 91b is rotatively mounted in bearings 92 and 93 which are respectively in a bearing block 94 and a bearing plate 95. The bearing block 94 and the bearing plate 95 are supported upon the right end sections, with respect to the machine as viewed in Fig. 1, of frame side-members 10 and 11. Rotation of the pulley 91a in the direction indicated by arrow 96 and the consequent rotation of the shaft 91b causes rotation of gears 97 and 98, the latter gear being fixed to a shaft 99 which is shown by a dotted line in Fig. 6 and by solid lines in Fig. 4.

Shaft 99, Fig. 4, has fixed thereto near its right end a compound gear structure 100 consisting of gears 101 and 102 of which the teeth respectively mesh with the teeth upon gears 76 and 73. Compound gear 103 includes gears 104, 105 and 106. The teeth of gears 104 and 106 are adapted to drive gears 74 and 81. The teeth on gear 105 are of such axial extent as to mesh with both gears 78 and 83. Compound gear structure 107 includes gears 108, 109 and 110. Gears 108 and 110 mesh with and drive gears 82 and 88 while the wide gear 109 meshes with and drives gears 84 and 90. Compound gear structure 111 comprises gears 112 and 113 for respectively driving the gears 89 and 91. The gears in each of the compound structures upon the shaft 99 are fixed for rotation with said shaft.

It will be noted that the pitch circles of flanged gears 76, 78, 83, 84, 90 and 91 are of the same diameter. Also, the diameter of the pitch circles of gears 101, 105, 109 and 113 for driving said flanged gears is the same, as is the pitch diameter of the gears 73, 74, 81, 82, 88, and 89, and the pitch diameter of gears 102, 104, 106, 108, 110 and 112. It will be further noted the ratio between the flanged gears as 76 and the gears as 101 for respectively driving the same is such with respect to the ratio between the roller-rod carrier gears as 73 and their respective driving gears as 102, that said flanged gears will be rotated at greater speed than the roller-rod carrier gears. When the shaft 99 is rotated in the direction indicated by the arrow 114, the flanges as 79 will be caused to rotate relatively to the roller-rod carrier gears as 74 in the direction indicated by the arrow 115, Fig. 5. Such relative movement between the flanges as 79 and the rod carrier gears as 74 imparts rotative force to the roller-rods as 75 about their own axes in the direction of arrows 116. Roller-rods as 75 are also caused to rotate in the direction indicated by arrows 116 because of the frictional engagement between said rods and their flexible bearing members as 56 during rotation of roller-rod carrier gears as 74 in the direction indicated by arrow 115. The ratio between the flanged gears as 78 and their driving gears as 105 is so selected that the gear flanges as 79 will be moved at the same speed as the surface sections of the roller-rods engaged therewith, assuming no slippage between the roller-rods and the flexible bearing members as 56 in support thereof; thus the roller-rods are complementally rotated about their individual axes because of their frictional engagement with gear flanges as 79 and flexible bearing members as 56 with respect to both of which there is movement by the rod-carrier gears as 74.

The fact that the bearing members as 56 are yieldable is responsible for diminishing the noise of the machine and also for effecting a uniform frictional engagement between said bearing members and the sections of the roller-rods 75 carried thereon. Also, the flexibility of the bearing members as 56 adapts them to be drawn firmly into engagement with the roller-rods as 75 by adjustment of the bolts 69 and by the constant force of the springs 51, Fig. 5.

An arm 118 is pivotally secured to the end casting 27, Fig. 3, by a bolt 117. Said arm 118 has an opening 119 in its lower end to loosely receive a stem 120 which is anchored within a lug 121 upon the casting 27. One end of a spring 123 disposed upon the stem 120 abuts against a washer 124 held from axial movement by a nut 125 which is locked in position by a lock-nut 126. The other end of the spring 123 bears against the lower end of the arm 118 thereby yieldingly urging said arm clockwise against an adjustable stop 127 upon the stem 120. The tension in the spring 123 for resisting counter-clockwise movement of the arm 118 may be adjusted by advancing or retracting the nut 125 axially of the stem 120 and thereafter holding the adjustment by means of the lock-nut 126.

A somewhat similar arrangement to that just described in the foregoing paragraph is provided upon a casting 128 supported between the frame side-members 10 and 11 as shown in Fig. 9. Casting 128 has an arm 129 pivotally depending therefrom about a bolt 130. The lower end of the arm 129 is provided with an oversize aperture 131 for receiving a stem 132 which is anchored in a lug 133 upon the casting 128. The stem 132 has thereon a stop 134, a spring 135, a nut 136 and a lock-nut 137 which correspond to the stop 127, the spring 123, the nut 125 and the lock-nut 126 hereinabove described with reference to Fig. 3. Spring 135 yieldingly urges the pivotal arm 129 counterclockwise against the stop 134. Arms 118 and 129 carry a tubular shaft 138 which extends lengthwise of the fruit-carrying cylinder 26; see Fig. 1. Because of the pivotal mounting of arms 118 and 129, the tubular shaft 138 may be shifted away from the fruit-carrying cylinder 26 against the urge of the springs 123 and 135 and moved toward said cylinder 26 by said springs until a predetermined position variable by the stops 127 and 134 is reached.

The tubular shaft 138 has non-rotatively thereon three pair of collars 139; see Figs. 1, 2 and 3. Flat faces 140 are provided diametrically opposite on each of the collars 139. Strip-like spring arms 141 are secured to the flat faces of each collar 139 by means of bolts 142. Each arm 141 has an arcuate section 143 adjacent to its unsecured end. Said arcuate sections are provided with threaded apertures for removably receiving threaded shanks of stop members 144 and 145.

The end sections of a pair of adjacently disposed arms 141 are shown in Fig. 13 in association with a stem-gripping or collecting shoe 146. Each of the shoes 146 as will be seen in Figs. 2, 12, and 13 has a back plate 147 which is arcuate in cross-section so that it fits snugly within the arcuate end sections of its respective spring-like arms 141. Clips 148 are secured to the back-plates 147. When it is desired to assemble a stem-collecting shoe with a pair of arms 141, the stop members 144 will be removed so the clips 148 may be slid into position on the end sections of said arms. Said stops are replaced subsequent to the assembly. The clips 148 are effective for holding the back-plate 147 of their shoes 146 firmly against the concave surfaces of the end sections 143 while permitting the shoes to have a limited oscillatory movement about the axis of generation of the arcuate surfaces within the arm end sections 143, the limits of such movement being determined by the stop members 144 and 145. This allowable relative movement between the stem-collecting shoes 146 and their supporting arms 141 enables the shoes 146 to become adjusted relatively to the arms 141 so that during operation of the device the shoes 146 may be most effectively presented to the fruit-holding cylinder 26. The stem-collecting shoes 146 comprise facing members 149 of yieldable or compressible material such as rubber. In Fig. 3 it may be seen that the longitudinal edges of the back plates 147 are turned inwardly to engage grooves 150 in opposite edges of their associated facing members 149 and in this way retain these parts in assembly.

Tubular shaft 138 is rotatable within its end mountings. The left end of the shaft 138, Fig. 1, has therein a bearing member 151 which is suitably journalled within a bearing 152 of the arm of 118, Fig. 3. The opposite end of the tubular shaft 138 is non-rotatively joined with a hollow bearing member 153 which abuts against the flat face 154 of a semi-cylindrical section 155 of the pivotally supported arm 129. Said section 155 has a semi-cylindrical bearing surface 155a having a vertical axis of generation, it being noted that Fig. 10 is a horizontal sectional view.

A second bearing member 156 is non-rotatively disposed within the tubular shaft 138 where said bearing member is held in place by a set-screw 157. A short shaft 158 is journalled within the bearing members 153 and 156, said shaft having a sprocket wheel 159 secured thereto. One face of the sprocket 159 is provided with an integral cam 160 comprising a rise section 161 and inclined sections as 162 arranged between the rise 161 and the low section 163 which covers the greater peripheral portion of the cam.

An oscillatory locking member 164 is mounted upon the semi-cylindrical surface 155a of the arm 129. Said oscillatory member 164 has an elongated opening 165 for receiving the shaft 158. The opening 165 is of a horizontal extent to permit the member 164 to pivot about its vertical axis a selected distance in either direction without interference of the shaft 158. The oscillatory member 164 has a spherical exterior bearing surface 166 which fits into a concave spherical surface of the cam 160 thus enabling the sprocket 159 and the cam 160 to continue rotative movement irrespective of the oscillatory position of the member 164. Member 164 has cam-follower lugs 167 and 168 which are alternately engaged by the rise 161 and the inclined sections 162 of cam 160 whereby oscillatory movement is imparted to member 164. Latch or stop pins 169 and 170 are provided in opposite sides of the oscillatory member 164, said pins being adapted to cooperate with a latch member 171 carried upon a leaf spring 172 which in turn is supported by a rib 173 extending radially from the bearing member 153.

The shaft 158, the sprocket 159 and cam 160 are caused to rotate in the direction of arrow 174, Fig. 10, during operation of the machine. Rotation of the bearing members 153 and 156 and the tubular shaft 138 is effected through a coil spring 175. One end of the spring 175 has a hook 176 which engages a pin 177 anchored in the shaft 158. An axially extending end section 178 of the spring 175, shown dotted in Fig. 10, is seated within a recess 179 in the bearing member 153.

When the sprocket 159 occupies the position shown in Fig. 10, the rise 161 of cam 160 will be in registry with the cam follower lug 168 whereby the stop pin 170 will be projected into the path of the latch 171. Incident to rotation, however, of the sprocket 159 and the shaft 158 which is driven from the hub of said sprocket, the stop pin 170 will act through the latch member 171, spring 172 and rib 173 to prevent rotation of bearing members 153 and 156 and the tubular shaft 138. During the ensuing rotative movement of shaft 158 under these conditions, the spring 175, which now has its end with the extension 178 held against movement with shaft 158, will be wound up. Subsequently, the rise 161 of the cam 160 will approach the cam follower lug 167 and as it does so the incline (not shown) on the opposite side of the rise 161 will engage the cam follower lug 167 thereby effecting movement of the member 164 counter-clockwise, Fig. 10, thus projecting the stop pin 169 into the path of the latch member 171 while the stop pin 170 is being withdrawn from engagement with the latch member 171. Because of the lateral flexibility of the spring 172 the frictional engagement between the latch member 171 and the stop pin 170 will cause the latch member 171 to follow the retracting pin 170 until the stop pin 169 is well within the path to be transversed by the latch member 171. Thereupon when the cam 160 has moved the member 164 a sufficient distance counter-clockwise the stop pin 170 will be withdrawn from the latch member 171 thus permitting the spring 175, while reacting against the pin 177 on the shaft 158, to unwind coincidentally with imparting rotative movement to the bearing member 153 and the tubular shaft 138. The tubular shaft 138 will be allowed to rotate 180 degrees, further movement being prevented by the latch member 171 engaging stop pin 169.

Incident to continued movement of the sprocket wheel and the shaft 158, cam 160 will cause the rise 161 thereon to approach cam follower lug 168 and thus rotate the member 164 clockwise incident to placing the stop pin 170 within the path of the latch member 171 and to removing the latch pin 169 from the path of said latch member. But during the time latch member 171 is held by stop pin 169, shaft 158 is rotating relatively to the non-rotating shaft 138 whereby the spring 175 is once more wound up so that upon retraction of stop pin 169 from engagement with the latch member 171 the shaft 138 will again be rotated 180 degrees by spring 175. Thus intermittent rotation of tubular shaft 138 through 180 degree arcs will be continued so long as the sprocket 159 and the shaft 158 are rotated. The stem-collecting shoes 146 are arranged upon the shaft 138 in a manner that results in one group of shoes being presented to the fruit carrying cylinder 26 during one quiescent period of the shaft and the other group being presented to the cylinder during the succeeding period.

The power train for driving the sprocket wheel 159 is shown in Figs. 1 and 6. Power from the pulley 91a is transmitted through shaft 91b, gears 180 and 181, shaft 181a, worm 182, worm wheel 183, a shaft 184, a chain sprocket (not shown) and a chain 185. Shaft 184 is journalled in a bearing 186 within a cross-piece 187 extending between and attached to the lower ends of bearing block 94 and bearing plate 95. Bolts 188 are employed for securing the cross-piece 187 in place.

Attention is also directed to a power train shown in Fig. 6 and for driving a rotatable feeder device indicated generally at 189 in Figs. 1, 7 and 8. The shaft 91b through a gear 190 thereon drives gears 191 and 192 which rotate together upon a stub shaft 193 suitably secured to the bearing plate 95. Gear 192 is meshed with and drives a gear 194 which is secured to a shaft 195 journalled within a bearing 196 of a bearing block 197. The bearing block 197 is pivotally supported in the upper sections of bearing block 94 and bearing plate 95 which have vertical notches as 198, Fig. 1, into which bearings 199 and 200 of the bearing block 197 are journalled. Stuffing caps 201 may be provided for closing the upper ends of the bearings 198. Said stuffing caps are held in place by pivot pins 202 extending through apertures respectively in ears 203 and 204 upon the caps 201 and the bearing block 94 and bearing plate 95. Similar ears 205 and 206 are apertured for receiving a removable pin such as a cotter pin 207 which may be removed easily thereby allowing the caps 201 to be pivoted about the pins 203 incident to opening the bearing notches 198 and permitting the bearing block 197 to be readily removed or assembled with the apparatus.

Bearing block 197 rotatably supports a shaft 208, Figs. 6 and 7, which is adapted to be driven by bevelled pinions 209 and 210 respectively secured to shafts 208 and 195. The rotatable feeder device 189 has a hub section 211 keyed to and driven by the shaft 208. The rotatable feeder device 189 comprises three radially disposed plates 212 extending between hub 211 and a circular wall 213. A set of three plate extensions 214 project radially from a hollow hub 215 which fits telescopically over the hub 211 and contains slots for receiving the plates 212. Flanges 216 are provided upon the plate extensions 214. Axial adjustment of the plate extensions 214 upon the hub 211 is accomplished by means of a bolt 217 which extends through the end wall of the holow hub 215 into threaded engagement with a recess 218 in the end of shaft 208. A spring 219 constantly urges the plate extensions 214 axially to the right, Fig. 7, against the head of the bolt 217. The combined width of the plates 212 and the plate extensions may be varied by advancing or retracting the bolt 217 within the threaded recess 218.

While the machine is in operation the feed device 189 including the plates 212 and extensions 214 are rotated in the direction indicated by arrow 220, Fig. 8. Fruit, such as cherries which are to have their stems removed are fed into the rotating mechanism 189 from a hopper 221. Fruit which has advanced by the force of gravity from the hopper 221 into the lower side of the rotating device 189 will be picked up by one of the plates 212 and its extension 214 thereby clearing a space into which additional fruit may gravitate from the hopper 221. The fruit that is carried upwardly by the plate 212 and its extension 214 will later be allowed to drop into the bottom of the said device but onto other fruit which has gravitated from the hopper thus heaping the fruit in the lower part of the device and causing a part thereof to spill to the left, Fig. 7, into a chute 222 which leads into the upper end of the fruit-carrying cylinder 26. By advancing the bolt 217 to the right, Fig. 7, and thus permitting the spring 219 to move the plate extensions 214 to the right the overall width of the plates 212 and plate extensions 214 is increased thereby increasing the capacity of the feeder apparatus. The capacity of the rotational feed device is increased by the flanges 216. Said flanges allow fruit picked up by their extensions 214 to fall only toward the chute 222.

The forward end of the hopper 221 rests within a yoke 223 which is supported upon rods 224 anchored within ears 225 of the pivotal bearing block 197. Angularity of the hopper 221 may be adjusted by means of its support member 226 having its upper end secured to the hopper 221 by means of a pivot pin 227 and a bracket 228. The lower end of the hopper supporting member has a series of notches 229 selectively engageable with the cross-piece 17 extending between legs 14 and 15 of the machine frame. Bearing block 197 is pivoted at bearing sections 199 and 200 incident to angular adjustment of hopper 221.

Beneath the fruit-carrying cylinder 26 there is a tank 230 resting upon frame cross-pieces 16 and 18. A screen constituting a frame 231 and a sheet of screen wire 232 or the like is supported upon one edge of the tank 230 by means of a flange 233 of an angle-iron strip 234 attached to the lower edge of the frame 231. The upper edge of the frame 231 rests against a cross-piece 235 shown dotted in Fig. 2 and extending between frame legs 13 and 15. Water which streams outwardly from the spray-pipe 39 during operation of the machine passes downwardly through the fruit-carrying cylinder 26 and the fruit therein, through the screen 232 and into the tank 230. The screen 232 is adapted to catch the stems which have been removed from the fruit. A spout 236 is attached to the end casting 27 and serves to catch and direct the fruit, as it is discharged from the fruit-carrying cylinder 26, into a suitable receptacle or onto a passing conveyor, as desired.

Operation of the machine:

The machine is set in motion by applying driving power to the pulley 91a, Fig. 6. As has been hereinabove described, the pulley 91a through shaft 91b and gears 97 and 98 effects rotation of shaft 99. Said shaft 99 by means of the various gears thereon which mesh with the flanged gears as 78 and rod-carrier gears as 74 cause the fruit-carrying cylinder 26 to be rotated while at the same time causing the roller rods as 75 to rotate about their individual axes.

Fruit which has been introduced into the hopper 221 is picked up by the rotating feed device 189 and transferred into the chute 222 and thence into section A or the upper-most end of the cylinder 26. As the cylinder 26 rotates the stem-bearing fruit is tumbled about in section A and in being so handled certain stems of the fruit will be projected outwardly between roller rods 75. One of the stem-gripping or stem-collecting shoes 146 supported upon the tubular shaft 138 in registry with section A of the fruit-carrying cylinder will be pressed against an exterior portion of the cylinder where it is adapted to engage the protruding fruit stems as illustrated in Fig. 14. Here it will be observed that the roller rods 75 are relatively large in diameter and relatively close together and consequently permit only the longer fruit stems to extend such a distance outwardly of the cylinder as to be effectively engaged by the stem-collecting shoe. While the cylinder 26 is rotated the roller rods 75 are carried bodily in the direction indicated by arrow 237, Fig. 14, and the rotation of the rods about their individual axes will be in the direction indicated by arrow 238. Such rotation of the rods 75 about their individual axes enable them to roll onto a fruit-stem while compressing the same against the cooperating stem-collecting shoe 146.

Rods 75 in section A of the fruit-carrying cylinder permit fruit stems to extend outwardly thereof such a distance that they will be engaged firmly enough between the roller-rods and the stem-collecting shoes as will enable the machine to extract the stems which are quite long or which are attached to maturely ripened fruit. Short stems or stems which are attached to fruit not so fully ripened will not be so effectively engaged by the stem-gripping shoes at section A of the cylinder as will enable the machine to remove those stems from the fruit.

Because of the front end of the cylinder 26 being lower than the back end thereof and because of the constant turbulation of the fruit within the cylinder 26, the fruit is gradually progressed from section A to section B. In section B of cylinder 26 the roller-rods 80 which are manipulated similarly to the roller-rods 75, are of less diameter and the spaces therebetween are of greater width thus permitting a greater portion of the fruit stems to project outwardly through the cylinder and to permit the stem-collecting shoes cooperating with this section of the cylinder to effect a firmer grip upon the fruit stems and to thereby remove shorter stems than could have been removed in cylinder section A, or remove the stems from fruit not so fully ripened.

Eventually the fruit reaches the cylinder section C where it will be observed in Fig. 16 that the roller-rods 29 are comparatively small with respect to roller-rods 27 or 28. In cylinder section C the roller-rods 29 will permit the fruit to come very near to the stem-collecting shoes associated therewith so that the shoes may obtain an effective grip upon the fruit stems even though the stems are short. The fruit upon passing from cylinder section C slides outwardly of the machine onto a spout 236 from which it is discharged for further treatment elsewhere.

By constructing the fruit-carrying cylinder or tunnel 26 in a manner that different sections thereof are adapted to more efficaciously operate upon fruit or stems of different character, the tendency of the machine to operate simultaneously upon the fruit at a single cylinder section will be diminished, and as a consequence there will be a reduction in the tendency for the fruit to be held at any certain section of the fruit-carrying cylinder where it might become bunched and bruised. It will be seen, therefore, that the present machine has the advantage of providing an extensive area over which fruit of different characteristics may be worked upon simultaneously without the disadvantage of crowding the fruit in any part of that area.

The fruit is treated more gently in the A section of the cylinder or tunnel 26 wherein the roller-rods are of greater diameter. Fruit from which the stems cannot be removed in this section of the machine is later operated upon in tunnel section B where the roller-rods are of less diameter. If the fruit contained no individual articles from which the stems are difficult to remove because of the firmness of such fruit or the shortness of the stems, substantially all of the stems would be extracted prior to it reaching tunnel section C. While tunnel section C acts comparatively rigorously upon the stem bearing fruit therein, such is not the case with regard to the stemmed fruit passing through this section of the machine. Consequently, the machine is capable of operating in a manner enabling it to gently handle such fruit as is adapted to be operated upon easily thereby and to give a more rigorous treatment only to such fruit as is difficult to stem.

A further advantage is gained by the provision in the present machine of groups of stem-collecting shoes which are alternately placed in cooperable relation with the fruit-carrying cylinder. Each time a shoe is removed from the cylinder 26 said shoe is freed of stems and is thus capable of providing a clean working surface when next presented to the cylinder.

I claim:

1. A fruit-stemming machine comprising a rotatable tunnel having a side wall, roller-rods extending axially of said tunnel within said side wall, a rotatable carrier member having bearings wherein said roller-rods are respectively journalled, a flexible band-like bearing member wherein said tunnel is supported, said bearing member being provided with a yieldable surface extending transversely of and in frictional engagement with roller-rod sections opposed thereto exteriorly of the tunnel, means constantly urging said bearing member against the opposed roller-rod sections, and means for rotating the tunnel to move said roller-rods along said bearing member and thus cause them to rotate in their carrier bearings.

2. In a fruit-stemming machine including a rotatable tunnel wherein the side wall comprises roller-rods rotatable about their individual axes which extend axially of the tunnel, a bendable strap-like bearing member for and extending in excess of 180° about said tunnel, said bearing member having a yieldable surface engaging the roller-rods and upon which said rods are adapted to roll during rotation of the tunnel, means for rotating said tunnel, and tensioning means constantly acting upon said bearing member to maintain the same tautly against the roller-rods rolling thereon.

3. In a fruit-stemming machine including a rotatable tunnel wherein the side wall comprises roller-rods rotatable about their individual axes which extend axially of the tunnel, a flexible strap-like bearing member embracing a section of said tunnel exteriorly and transversely thereof and having a surface engaging the roller-rods exteriorly of the tunnel, tensioning means constantly acting upon said bearing member to maintain the same tautly against the roller-rods, means for rotating the tunnel, and means coacting with the strap-like bearing member to rotate the rods simultaneously with the rotation of the tunnel.

4. In a fruit-stemming machine, a rotatable fruit-conveyor tunnel including a plurality of sections through which fruit is successively passed, each of said tunnel sections being provided with a side wall comprising laterally spaced roller-rods extending axially of the tunnel and rotatable about their individual axes, the diameter of the rods in said sections decreasing in the order fruit is received thereby and the lateral spacing of the axes of the less diameter rods respectively in said sections being likewise decreased, and means for rotating said tunnel and for rotating said rods about their individual axes.

5. In a fruit-stemming machine, a rotatable fruit conveyor tunnel including a plurality of sections through which fruit is successively passed, each of said tunnel sections being provided with a side wall comprising laterally spaced roller-rods extending axially of the tunnel and rotatable about their individual axes, the diameter of the said rods in said sections decreasing in the order fruit is received thereby whereas the spaces between said rods in each of said sections are substantially the same, and means for rotating said tunnel and for rotating said rods about their individual axes.

6. In a fruit-stemming machine, a rotatable fruit-conveyor tunnel including a plurality of sections through which fruit is successively passed, each of said tunnel sections being provided with a side wall comprising laterally spaced rods extending axially of the tunnel, the rods in a preceding section from which the fruit is discharged into a succeeding section being of greater diameter than the rods in the succeeding section, the lateral spacing of the rods in said sections being such that the spaces between the rods in each of said sections are substantially equal, and means for rotating said tunnel.

7. In a fruit-stemming machine, intermittently movable stem collecting means, and means for moving said stem collecting means, comprising a latch member movable with said stem collecting means, a plurality of movable stop members, a rotatable shaft, an energy storage spring having one section connected with said shaft and another section connected with the stem collecting means, and a cam rotatable with said shaft, said cam being operative to move said stop members to and from positons where they are adapted to be individually abutted by said latch member, said spring being energized during rotation of the shaft while said latch member is abutted against one of said stop members, and the movement of said stop members being so coordinated that after predetermined rotation of the shaft a stop member abutted by the latch member will be removed from such abutting relation while the other of said stop members is moved into position where it is adapted to be abutted by the latch member, and the then energized spring becoming effective upon the removal of the one stop member to cause movement of said stem collecting means until interruption by the latch member coming into abutment with the other of said stop members.

8. In a fruit-stemming machine including a rotatable fruit carrier having a side wall provided with spaces through which the stems of fruit in said carrier are adapted to project, means for rotating the carrier, a plurality of stem-collecting shoes exteriorly engageable with the carrier wall whereby the projecting stems are gripped between said shoes and said wall as an incident to being extracted from the fruit during rotation of the carrier, a rotatable support member for said shoes, means for intermittently rotating said support member, and resilient arms for securing said shoes upon said support member, said support member being adapted to successively present said shoes in registry with and against said carrier incident to flexing the resilient arms associated therewith whereby said arms are effective for holding their respective shoes impingingly against the carrier.

9. In a mechanical movement, an intermittently rotatable part, a latch member movable with said intermittently rotatable part, a spring having a section drivingly connected with said part, a constantly rotatable shaft drivingly connected with a different section of said spring, a cam movable with said shaft, and a plurality of stop members shiftable by said cam to and from positions where said stop members are adapted to be individually abutted by the latch member to prevent movement of said intermittently rotatable part, said shaft being operative to energize said spring while the latch member prevents rotation of said intermittently rotatable part by abutting against one of the stop members, said shaft being concurrently operative for moving said cam to remove the said one stop member from said latch member thereby permitting rotation of said intermittently rotatable part under the influence of said spring and for moving the other of said stop members into position for abutment by said latch member and thereby interrupting the rotation of said intermittently rotatable part under the influence of said spring.

10. In an article conveyor tunnel having a side wall, coaxially rotatable roller-rod carrier and roller-rod driver members, roller-rods extending axially of said tunnel within the side wall thereof, said roller-rods being journalled in said carrier member, a flexible strap-like tunnel supporting member having a yieldable surface extending exteriorly and transversely about a section of said tunnel in engagement with roller-rod sections opposed thereto, tensioning means constantly acting upon said supporting member to maintain said surface thereof firmly against said opposed roller-rod sections, said driver member frictionally engaging the roller-rods interiorly of said tunnel complementally with said tunnel supporting member and being thus adapted to effect rotation of said roller-rods within their respective carrier journals incident to rotation of said driver member, means for rotating said driver member, and means for rotating said carrier in the same direction but at a speed less than that of the driver member.

11. In a fruit-stemming machine, a rotatable fruit-conveyor tunnel including a plurality of sections for successively receiving fruit passed through said tunnel, each of said tunnel sections having a side wall, roller-rods in each of said side walls and extending axially of said tunnel, carrier members rotatable coaxially with the tunnel and having respectively journalled therein the rods of adjacent of said tunnel sections, tunnel support and bearing means providing rolling surfaces for said rods exteriorly of the tunnel, a roller-rod driver member rotatable coaxially with said tunnel and engaging the rods interiorly of said tunnel sections, means directly engaging said carrier members for rotating the same, and means between said carrier rotating means and directly engaging said driver member for rotating said member in the same direction as said carrier members but at greater speed.

12. In a fruit-stemming machine, a rotatable fruit-conveyor tunnel including a plurality of sections for successively receiving fruit passed through said tunnel, each of said tunnel sections having a side wall, roller-rods in each of said side walls and extending axially of said tunnel, carrier members rotatable coaxially with the tunnel and having respectively journalled therein the rods of adjacent of said tunnel sections, a gear upon each of said carrier members, tunnel support and bearing means providing rolling surfaces for said rods exteriorly of the tunnel, a roller-rod driver member rotatable coaxially with said tunnel and engaging the rods interiorly of the tunnel sections, a gear upon said driver member, all of said gears being coaxial with said tunnel, and driving gears respectively meshed with the aforementioned gears for rotating said carrier members and said driver member, and the ratios of said gears being such that the driving member is driven at a speed exceeding that of the carrier members.

13. In a fruit-stemming machine, a rotatable fruit-conveyer tunnel including a plurality of sections for successively receiving fruit passed through said tunnel, each of said tunnel sections having a side wall, roller-rods in each of said side walls and extending axially of said tunnel, the rods in the preceding of two adjacent of said sections for receiving fruit being larger in diameter than that of the rods in the succeeding of such adjacent sections but the spaces between the rods of such adjacent sections being substantially equal, carrier members rotatable coaxially with the tunnel and having journalled therein the rods of said adjacent sections, tunnel support and bearing means providing rolling surfaces for said rods exteriorly of the tunnel, a roller-rod driver member rotatable coaxially with said tunnel and engaging the rods interiorly of said tunnel sections, means directly engaging said carrier members for rotating the same, and means between said carrier rotating means and directly engaging said driver member for rotating said member in the same direction as the carrier members but at greater speed.

14. In a fruit-stemming machine, a rotatable fruit-conveyor tunnel including a plurality of sections for successively receiving fruit passed through said tunnel, each of said tunnel sections having a side wall, roller-rods in each of said side walls and extending axially of said tunnel, the rods in the preceding of two adjacent of said sections for receiving fruit being larger in diameter than that of the rods in the succeeding of such adjacent sections but the spaces between the rods of such adjacent sections being substantially equal, carrier members rotatable coaxially with the tunnel and having journalled therein the rods of said adjacent sections, a gear upon each of said carrier members, tunnel support and bearing means providing rolling surfaces for said rods exteriorly of the tunnel, a roller-rod driver member rotatable coaxially with said tunnel and engaging the rods interiorly of such adjacent tunnel sections, a gear upon said driver member, all of said gears being coaxial with said tunnel, and driving gears respectively meshed with the aforementioned gears for rotating said carrier members and said driver member, and the ratios of said gears being such that the driving member is driven at a speed exceeding that of the carrier members.

15. In a fruit-stemming machine, a carrier including a side wall provided with spaces through which the stems of fruit in said carrier are adapted to project, rotatable stem-collecting shoe supporting means, a plurality of stem-collecting shoes yieldingly and resiliently disposed upon said supporting means and presentable to an exterior section of said carrier wall to impinge such projecting of said stems thereagainst, means for moving said carrier wall relatively to said shoes to extract the thus impinged stems from the fruit, and means for intermittently rotating said supporting means to successively present the shoes to said carrier wall section.

16. Fruit-stemming apparatus comprising a rotatable fruit carrier including a wall section through which the stems of fruit project outwardly during rotation of the carrier, means for rotating said carrier, a plurality of stem-collecting members registerable with and impingeable against the outer periphery of said wall section, rotatable support means for said members, means for intermittently rotating said support means for successively disposing said members in such impinging registry and for removing them from such registry, and means for suddenly terminating each intermittent rotative movement of the support means to discharge fruit stems from each stem collecting member following its removal from registry with said wall section.

17. Fruit-stemming apparatus comprising a rotatable fruit carrier including a wall section through which the stems of fruit project outwardly during rotation of the carrier, means for rotating said carrier, a plurality of stem-collecting members registerable with and impingeable against the outer periphery of said wall section, rotatable support means for said members and yieldably and resiliently resisting displacement of said members radially inwardly thereof, means for intermittently rotating said support means for successively disposing said members in such impinging registry and for removing them from such registry, and means for suddenly terminating each intermittent rotative movement of the support means to discharge fruit stems from each stem collecting member following its removal from registry with said wall section.

WILLIAM E. URSCHEL.